UNITED STATES PATENT OFFICE.

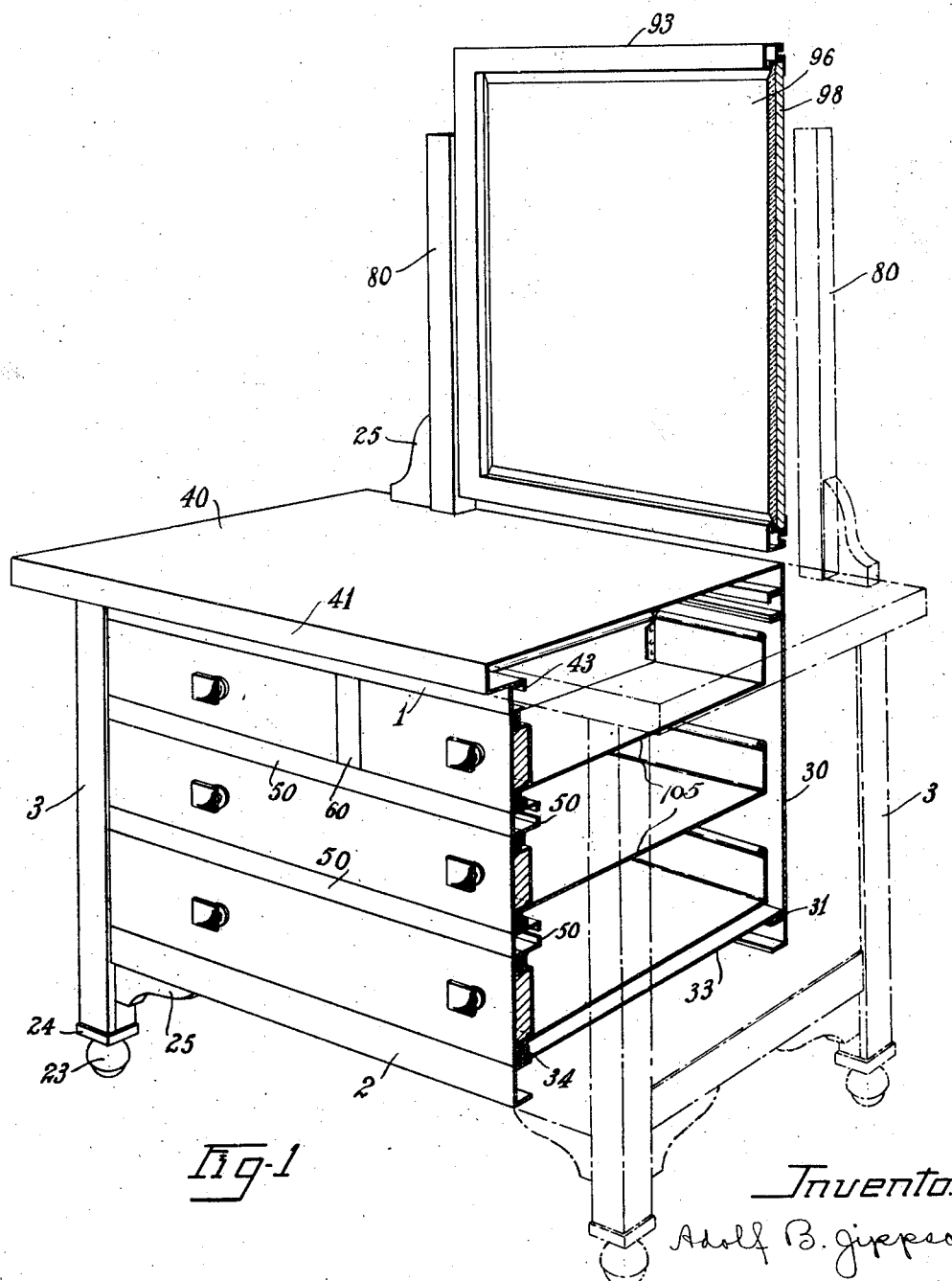

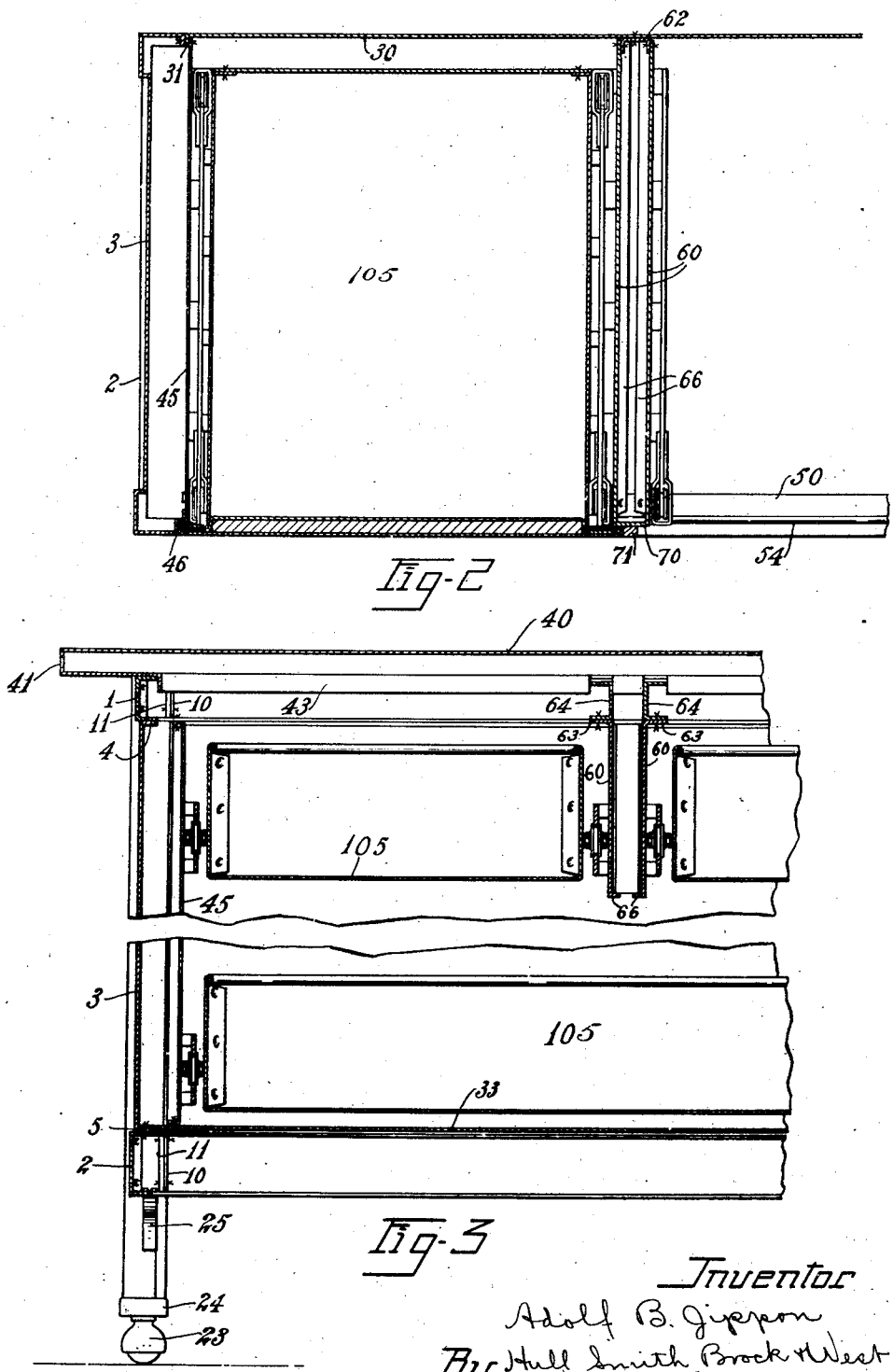

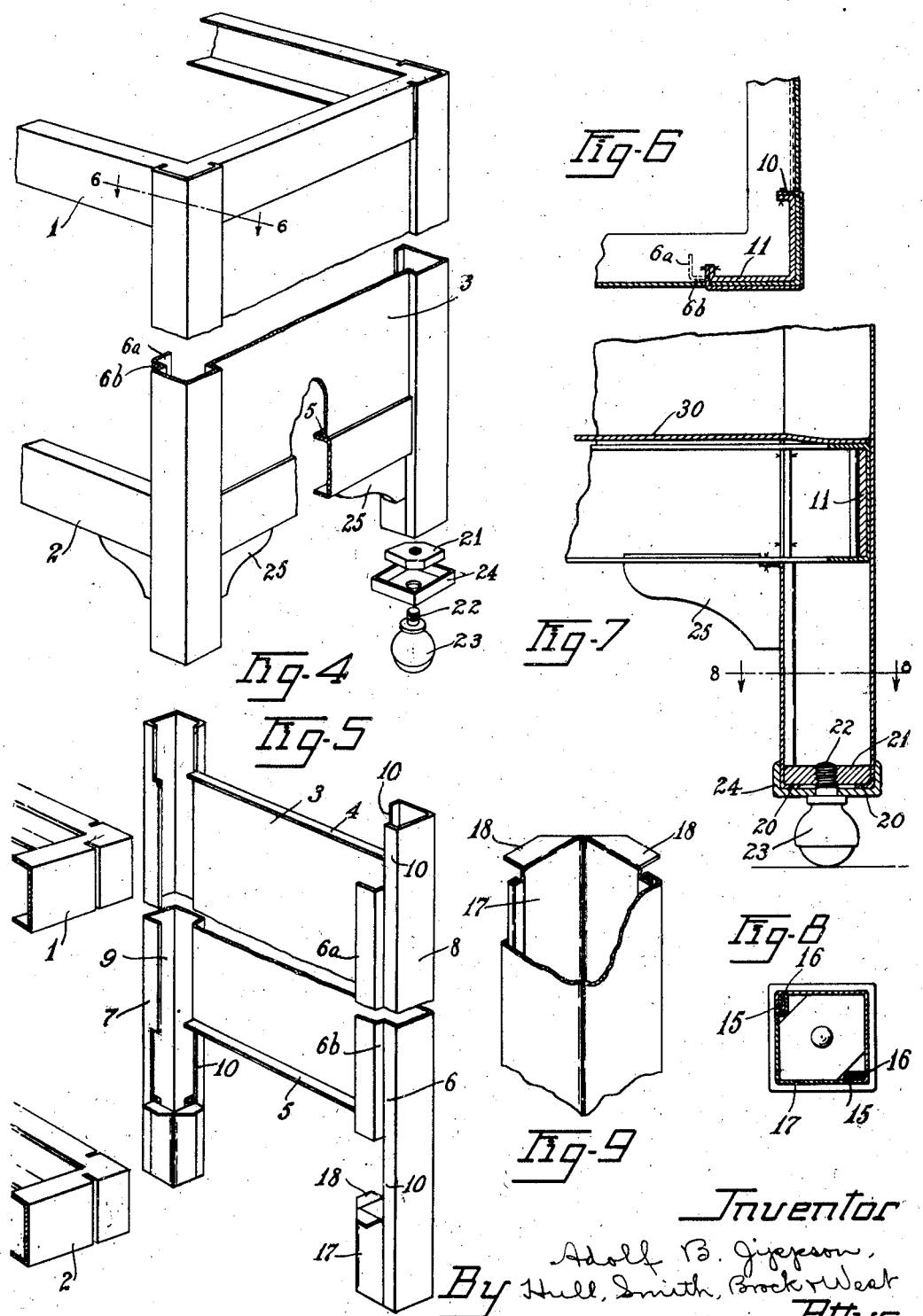

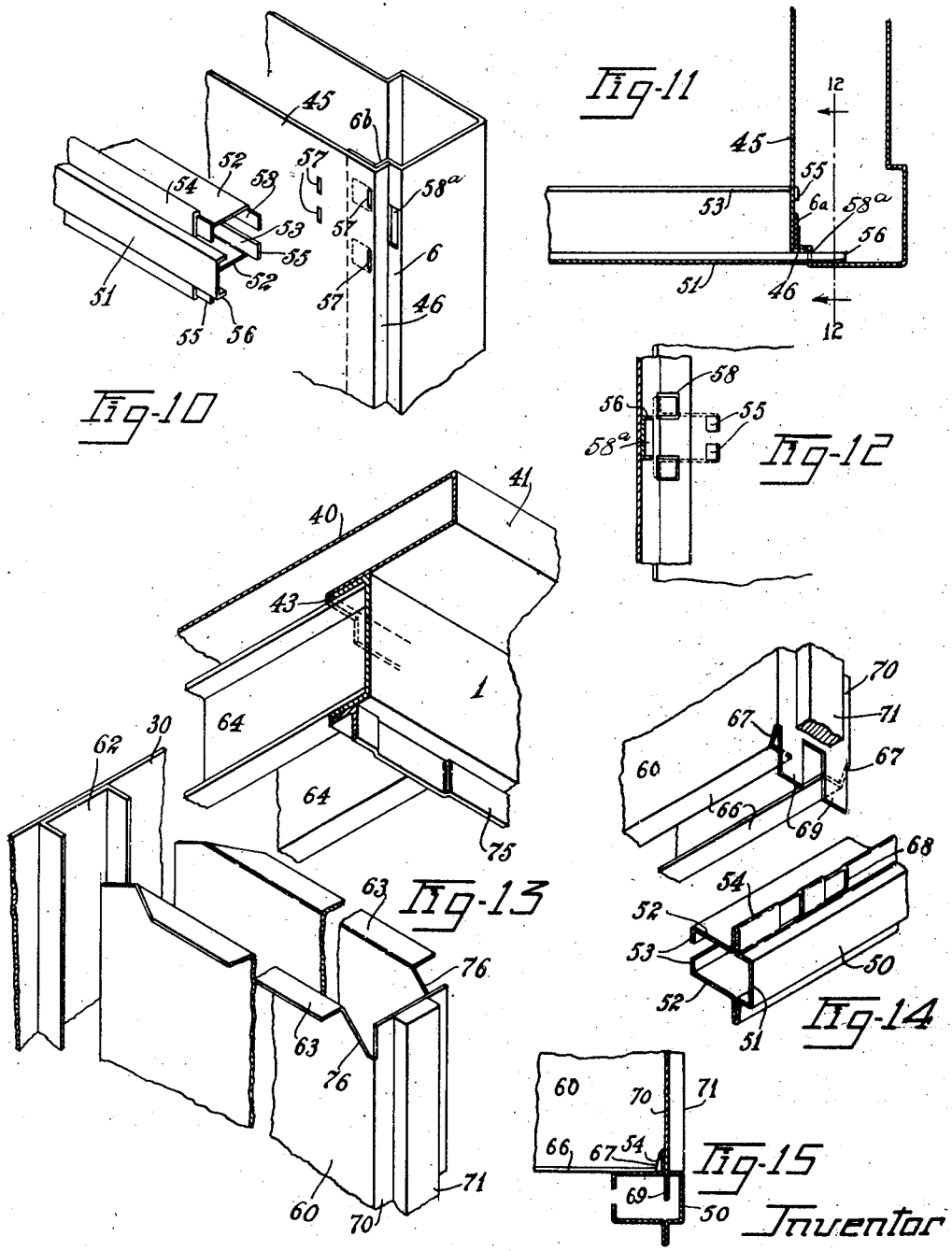

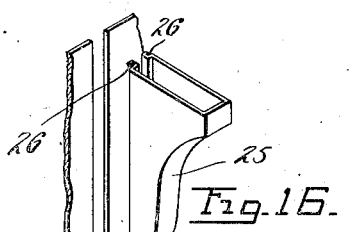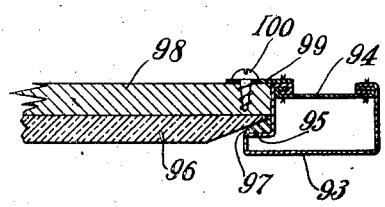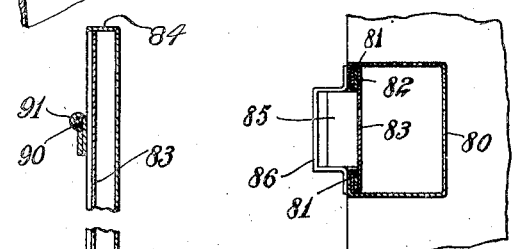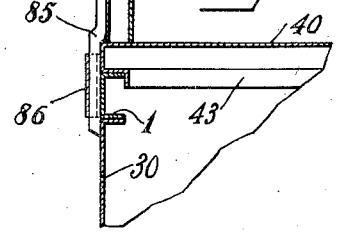

ADOLF B. JIPPSON, OF CLEVELAND, OHIO, ASSIGNOR TO THE OHIO BLOWER COMPANY, OF CLEVELAND, OHIO, A CORPORATION OF OHIO.

FURNITURE.

1,345,366.  Specification of Letters Patent.  Patented July 6, 1920.

Application filed March 3, 1917. Serial No. 152,429.

*To all whom it may concern:*

Be it known that I, ADOLF B. JIPPSON, a subject of the King of Sweden, residing at Cleveland, in the county of Cuyahoga and State of Ohio, have invented a certain new and useful Improvement in Furniture, of which the following is a full, clear, and exact description, reference being had to the accompanying drawings.

This invention relates to improvements in furniture construction, particularly metal furniture construction, and has for its main object the production of furniture of this character having the appearance, when suitably finished, of wooden furniture, while possessing superior strength and durability, with the further advantage of being fireproof.

Further objects, emanating from the above, are to conceal the means whereby the elements of the structure are connected; to provide panel effects in imitation of wooden structures, at the same time utilizing the means of attaining such effects to increase the strength of the furniture and its convenient and economical production; to provide a double wall construction, whereby the fireproof feature is enhanced; to provide a dust-excluding structure; and to provide unique joints and connections through which the attainment of certain of the foregoing objects is made possible.

As illustrative of my invention, I have elected to show it embodied in a bureau, although its individual features are of more general adaptability and applicable to numerous articles. Consequently, the scope of the invention may be considered co-extensive with the terms of the annexed claims and not limited to the illustration herein.

In the accompanying drawings Figure 1 is a perspective view, partly in vertical section, of a bureau embodying my invention; Fig. 2 is a partial horizontal section through the same; Fig. 3 is a fragmentary sectional front elevation of the bureau, the mirror and its supporting parts being omitted; Fig. 4 is a perspective view including fragments of the upper and lower channel frames, one of the end plates or members whereby the channel frames are connected, and other parts associated therewith; Fig. 5 is a perspective view including the main elements shown in Fig. 4 in separated condition; Fig. 6 is a horizontal section on the line 6—6 of Fig. 4; Fig. 7 is a vertical section through one of the front legs and adjacent parts of the bureau structure, the plane of section being parallel to an end elevation; Fig. 8 is a horizontal section on line 8—8 of Fig. 7; Fig. 9 is a fragmentary perspective of the leg construction; Fig. 10 shows, in perspective, the end of a throat piece and that portion of an end of the structure to which the throat piece is arranged for connection; Fig. 11 is a horizontal section through the joint between the throat piece and end member; Fig. 12 is a section on line 12—12 of Fig. 11; Fig. 13 is a fragmentary perspective view of a partition involved in the bureau structure and includes adjacent parts of the top and back; Fig. 14 is a similar view of adjoining parts of the partition and throat piece; Fig. 15 is a vertical section through the connection between the partition and throat piece; Fig. 16 is a perspective view of a bracket employed in the structure, and a part to which it is adapted to be connected; Fig. 17 is a vertical section through one of the mirror supporting posts and adjacent portion of the bureau; Fig. 18 is a section on line 18—18 of Fig. 17; Fig. 19 is a sectional detail through the mirror and frame; and Fig. 20 is a fragmentary rear elevation of the parts shown in the preceding figure.

The structure comprises generally an upper and a lower channel frame which are spaced apart and rigidly connected together by end members or plates; the space between the rear edges of the end members and the corresponding sides of the upper and lower channel frames is closed by a back plate; throat pieces extend between the forward edges of the end members and divide the open front of the structure into drawer receiving openings, the upper opening being preferably subdivided by a vertical central partition into two drawer receiving openings; a top surmounts the upper channel frame and is formed with a depending flange which fits within said frame, thereby to properly position it with respect to the frame; a bottom plate extends from end to end of the structure and from the front to the rear thereof and its edges are supported by the lower channel frame; liners extend from the front to the rear edges of the end members and from the bottom plate upward to the plane of the underneath side of the upper channel frame; uprights are rigidly connected to the rear edge of the top of the structure; and a mirror frame is preferably pivotally supported by and between said uprights.

As will be more specifically described hereinafter, the end members coöperate with the ends of the channel frames in a manner to produce pleasing panel effects; and the end members have upwardly and downwardly projecting corner extensions which embrace and are connected in a unique way to the corners of the frames, the lower extensions projecting a material distance below the lower frame to constitute, with other parts, legs to which suitable casters may be attached. The formation of the throat pieces, front edges of the end members, and other parts wherewith the overhanging portions of the drawer fronts coöperate, should be noted as such parts are hereinafter described in detail.

The upper and lower channel frames are designated 1 and 2, respectively, and the end plates or members are designated 3. The structure is symmetrical (as viewed from the front) and a description of one end, to and including the central portion, will be sufficient to convey a clear understanding of the entire structure.

Each channel frame may be constructed of comparatively heavy sheet metal, with the ends of the channel joined together. Its flanges, at the corners, may be mitered and connected, all joints being preferably welded, so that, in effect, each frame is a solid, integral structure. The particular manner in which the corners are cut and welded and the ends are connected are details deemed unessential and therefore unnecessary of further description.

The upper and lower edges of each end plate or member 3 is flanged inward at 4 and 5, respectively, the former to engage the underneath flange of the upper channel frame and the latter to rest upon the upper flange of the lower frame. Preferably the central portion of each end plate is inset somewhat from the common plane of the outer surfaces of the upper and lower frames so as to give it the effect of a panel. The vertical edge portions of each plate, which, it will be observed, extend above and below the central portion, are turned outward at substantially right angles to the central portion and then in opposite directions parallel to the plane of such portion and in contact with the outer surfaces of the channel frames. The edge portions are further bent at right angles about the corners of the channel frames to snugly embrace the corners and then directly inward toward each other, the inturned front and rear edge portions being designated 6 and 7, respectively, while the respective front and rear angular portions which embrace the corners of the frames are designated 8 and 9. The portions 8 and 9 extend flush with the top surface of the upper frame and downward a substantial distance below the bottom of the lower frame, thereby to produce corner posts, the lower ends of which constitute legs. Between the upper and lower channel frames, the extreme front edge portion 6ª of each end plate is turned at right angles to the portion 6 toward the center of the structure and then inward at right angles in substantially the plane of the rear inturned edge portion 7. On each side of each of the frames 1 and 2, adjacent each of its corners, the web of the channel whereof the frame is formed is slotted vertically to receive the inwardly directed edge of an angular portion or post 8 or 9, the edges thus projected through the slots of the channel frames being designated 10, and, within each corner of each frame, an angle plate 11 reposes, having its ends turned inward in juxtaposition to the flanges 10 and welded or otherwise secured thereto for the purpose of securely holding the angular portion of the end plate in rigid connection with the corner of the frame.

Below the lower frame, the edges of the angular portions 8 and 9 of the plates 3 are turned inward and then backward over their adjacent portions to constitute channels 15 into which the hooked edge portions 16 of angle plates 17 may be slid upward from the bottom, thereby to complete the legs which, it will be observed, particularly from Fig. 8, are square in cross-section. The upper edges of the sides of the angle plates 17 are turned outward at 18 for engagement with the underneath surface of the channel frame 2 and are attached thereto, preferably by spot welding. The lower ends of the plates whereof the legs are formed are turned inward to produce flanges 20 on which plates or nuts 21 rest, the plates or nuts having each a central, threaded aperture for the reception of the threaded stud 22 of a caster 23, between which, and the flanges 20, is clamped a finished cap 24 having a central aperture for the passage of the stud 22.

Fitted into the angles between the frame 2 and the legs are brackets 25 (see Fig. 16). each being preferably formed of sheet metal and having the edges of the metal along one of its straight sides turned inward then outward and back over themselves to produce outwardly opening channels 26 which are adapted to receive the opposed edges of slots formed in the underneath flange of the frame 2. These brackets are used within various angles of the structure and in all cases are identical with the ones just described in connection with the legs. In each instance, therefore, the bracket will be designated 25.

A back plate 30 closes the space between the rear sides of the upper and lower channel frames and the inturned rear edge portions of the end plates, the back plate being provided with inwardly directed flanges 31 for coöperation with such parts. A bottom plate 33 extends from one end plate to the other and overlies the flanges 5 thereof, and from the back plate 30, where it rests upon the lower flange 31 of the back plate, forward over the upper flange of the lower frame 2. At its front edge, the bottom plate is turned upward, inward and over on itself, as represented at 34, the front of the portion 34 being in substantially the plane of the centrally directed portions 6$^b$ of the end plates. The top 40 of the structure is preferably formed of a single piece of sheet metal having a depending peripheral flange 41 of a depth equal to the thickness of top desired, and beyond the flange 41, the edge portion of the metal is turned inward over the top of the upper frame and then downward immediately inside the frame to constitute a flange 43 which serves to properly position the top with respect to the frame.

A liner 45 is provided for each end plate, and the same has its front edge flanged outward at 46 to overlie the portion 6$^b$ of its respective end plate, while the rear edge of the liner engages the inner side of the adjacent end flange 31 of the back plate 30. The lower edge of each liner is turned outward, upward and back upon itself and rests upon the bottom plate 33, while the upper edge of the liner is treated in a similar manner, for strengthening purposes.

The top may be secured to the frame 1 by any suitable fastening means, such as bolts; and the engaging portions of the end plates, channel frames, bottom plate, back plate, and liners may be connected together by spot-welding.

Throat pieces 50 extend parallel to the front sides of the frames 1 and 2 between the forward edges of the end plates or members and are properly spaced between the frames to divide the open front of the structure into drawer receiving openings of appropriate size. Each throat piece is, in general, of channel formation and comprises (as will be seen from Figs. 1, and 10 to 12,) a central web portion 51, opposed side flanges 52 and rear inwardly directed flanges 53, the material of the side flanges 52 being crimped outward to form ribs 54 adjacent the front of the throat pieces. The ribs 54 are in substantially the plane of the flange portion 46 of the liners 45, and with such portions constitute drawer jambs, as will be presently seen. Upon referring to Figs. 10 to 12, it will be observed that the ends of the side flanges 52 are cut away in a manner to produce tongues 55 of the remaining end portions of the flanges 53, and the rear sides of the ribs 54. The ends of the web or central portion 51, together with the adjacent portions of the side flanges 52 forward of the ribs 54, extend even farther beyond the cut away ends of the side flanges than the tongues 55 and, by reason of their function, which will be explained presently, these central extensions may be termed dowels, the same being designated 56. The liners 45 are provided with slots 57 for the tongues 55, and the underlying inturned edge portions 6$^a$ of the end plates are provided with openings 58 for the accommodation of the forward tongues 55, when such tongues are projected through the appropriate slots 57 and are turned over rearwardly. The rear tongues 55 extending through the corresponding slots 57 and are turned forwardly into contact with the liner. The portion 6 of each end plate is provided with a rectangular slot 58$^a$ through which a dowel 56 projects.

The space between the upper throat piece 50 and the frame 1 is preferably divided into two drawer openings of equal size by a partition 60. This partition is formed of a piece of sheet metal, substantially U-shaped in horizontal section, and the rear edges of which are spaced apart by, and connected to, the side flanges of a channel member 62 that is secured to the back plate 30 (Figs. 2 and 13). The upper edges of the sides are flanged outward at 63 for connection with the underneath flanges of channel members 64 which extend from front to rear between the opposed sides of the upper channel frame and have their ends secured within the channel of the frame by any suitable means. The lower edges of the sides of the partition are flanged inward at 66, and where they overlie the top of the throat piece 50, are preferably spot-welded thereto. The front lower corners of the sides of the partition are notched at 67 to accommodate the rib 54 of the throat piece, and the front side of said rib is notched at 68 for the reception of tongues 69, depending from the lower edge of the front portion 70 of the partition. By the joint thus formed between the partition and throat piece, wherein the parts do not overlap but neatly interfit, the surface of the front portion 70 is made flush with the corresponding surface of the rib 54. A finishing strip 71 extends longitudinally of the front portion of the partition between the upper surface throat piece and the underneath surface of the upper channel frame, the front surface of the finishing strip being in substantially the plane of the front surface of the throat piece. A drawer jamb 75, in the form of an angle bar, extends along the under side of the top channel frame between the front portions of the end plates or members, and at its longitudinal center is depressed a distance substantially equal to the thickness of the metal whereof the partition 60 is formed, and the upper front corners of the sides of the partition are notched at 76 for the accommodation of this jamb.

Rising from the rear edge of the bureau top, near each of its ends, is a mirror support 80 of tubular formation, the construction of which is revealed in Figs. 17 and 18. The front and sides of each support are formed of a single piece of metal, and its vertical edges are turned inward at the rear, at right angles, and then forwardly and back again at right angles to its sides to form channels 81 for the reception of the hooked vertical edged portions 82 of a back strip 83. An extension 84 of the front is turned back over the top of the back strip and its side and rear edges are welded or otherwise secured to the adjacent edges of the strip and sides of the support. The supports are removably attached to the body of the bureau by tenons 85, which have their upper ends secured to the back strips 83 and their lower ends received by sockets formed of U-shaped straps 86 that have their outwardly bent ends secured to the rear of the bureau.

Swung between the supports 80, upon pintles 90, which are journaled within and frictionally engaged by adjustable loops 91 that are attached to the rear of the uprights, is a mirror frame 93. The sides of this frame are made of two parts, the front part, to which the numeral 93 is applied, and a rear plate 94 which is connected to the front part in the same manner as the corresponding parts of the supports 80 are connected, as above described. The frame is formed with an inwardly directed lip or ledge 95 adjacent its front side against which the edge of the mirror 96 and an intervening strip of cushioning material 97 are clamped by a backing 98 of wood or other suitable material, the backing being held in place by clips 99 that are welded or otherwise secured to the inner rear edge of the frame and overlie the backing. In the present instance, the clips are provided with apertures for the passage of screws 100, shown as driven into the backing. Preferably, the joints between the front and rear parts 93 and 94, respectively, of the frame are spot-welded together; and the sides of the frame, at the corners, are mitered and welded together, so that the frame, after it is once assembled, is, in effect, an integral structure.

A drawer 105 occupies each drawer opening of the bureau.

I have set up in the beginning of this specification the production of a double wall structure as one object of the invention. It will be recalled that the ends are double. The space between the end plates and liners may be lagged with non-heat conducting material if desired, as well as the top. This is a feature common in metal cabinet work and is deemed unnecessary of illustration. Now take into consideration that the storage space is inside the drawers and it will be seen that, including the walls of the drawers, there is a double wall at the back, and also at the bottom.

Having thus described my invention, what I claim is:—

1. In an article of furniture, the combination of an upper and a lower frame, and members having panel sections fitting between and engaging the frames and upper and lower extensions secured to the frames for holding the frames against the panel sections.

2. In an article of furniture, the combination of an upper and a lower frame, and members having panel sections fitting between the frames and upper and lower corner extensions embracing and attached to the corners of the frames thereby to hold the frames against the panel sections.

3. In an article of furniture, the combination of an upper and a lower frame, and members having panel sections fitting between the frames and upper and lower extensions attached to the frames whereby the frames are held against the panel sections, the lower extensions projecting below the lower frame and forming legs.

4. In an article of furniture, the combination of an upper and a lower channel frame, and members having panel sections fitting between the frames and upper and lower corner extensions of angular formation embracing the corners of the respective frames, the webs of the channel frames being slotted to receive the edged portions of the aforesaid corner extensions.

5. In an article of furniture, the combination of an upper and a lower channel frame, and members having panel sections fitting between the frames and upper and lower extensions projecting across the webs of the respective frames, the webs of the channel frames being slotted to receive the edged portions of the aforesaid extensions.

6. In an article of furniture, the combination of an upper and a lower channel frame, and members having upper and lower portions extending across the webs of the respective channel frames, the webs of the channel frames being slotted to receive the edges of the aforesaid portions.

7. In an article of furniture, the combination of an upper and a lower channel frame, members having upper and lower portions extending across the webs of the respective frames, the webs of the channel frames being slotted to receive the edges of the aforesaid portions, and means within the channels of the frames for holding said edges against withdrawal.

8. In an article of furniture, the combination of an upper and a lower frame, and opposed members having their central portions inset to form panels, the upper and lower edges whereof are flanged inward for coöperation respectively with the bottom of the upper frame and the top of the lower frame, the front and rear vertical portions of the members extending above and below their panel portions and formed to embrace the corners of the frames, and means for attaching the members to the frames.

9. In an article of furniture, the combination of an upper and a lower channel frame, opposed end members having their central portions inset to form panels, the upper and lower edges whereof are flanged inward for coöperation respectively with the upper and lower frames, the front and rear vertical portions of the end members extending above and below the aforesaid panels and formed to embrace the corners of the frames, the webs of the channel-frames being slotted to receive portions of the end members, and means within the corners of the frames for coöperation with said portions and for holding them against withdrawal.

10. In an article of furniture, the combination of a frame, opposed members having the central portion of their upper ends cut downward and turned inward to fit beneath the frame while the front and rear portions of said members extend upward and overlie the frame for connection therewith.

11. In an article of furniture, the combination of a channel frame, opposed members having their central portions inset to form panels the upper edge whereof is flanged inward for coöperation with the underneath side of the channel frame, the front and rear upper corners of the members extending upward about the corners of the frame, the web of the channel frame being slotted to receive portions of said members, and means within the channel frame for attaching the members to the frame.

12. In an article of furniture, the combination of an upper and a lower substantially rectangular frame, opposed end members spacing apart and connecting the frames, the front and rear edge portions of the end members being turned inward at substantially right angles to their body portions along the respective front and rear sides of the frames, a liner extending from the front inturned edge portion to the rear inturned edge portion of each end member, and a back plate closing the space between the upper and lower frames between the rear edges of the end members.

13. In an article of furniture, the combination of an upper and a lower frame, opposed end members spacing apart and connecting said frames, liners spaced inward from the end members, a back plate fitting between the frames and the rear portions of the end members, a bottom plate supported upon the lower frame within the confines of the end members and back plate, and a top supported by the upper frame.

14. In a leg construction for articles of furniture of the class described, the combination with a frame, of a plate of angular formation embracing the corner of the frame and extending below the same, the vertical edges of said plate being turned inward beneath the frame, and a second angle plate the vertical edges whereof interlock with the corresponding inturned edges of the former plate and having lateral flanges for connection with the underneath side of the frame.

15. In a leg construction for articles of furniture of the class described, the combination with a frame, of a plate of angular formation embracing the corner of the frame and extending below the same, the edges of said plate being turned inward beneath the frame, and a second angle plate the vertical edges whereof interlock with the corresponding inturned edges of the former plate and having its upper end arranged for connection with the underneath side of the frame.

16. In a leg construction for articles of furniture of the class described, the combination with frame, of a plate of angular formation embracing the corner of the frame and extending therebelow, the vertical edges of the plate being turned inward beneath the frame and shaped to form channels, a second angle plate the vertical edges whereof are formed for sliding engagement with the edge portions of the former plate, wherefore the second plate may be connected to the former by inserting its edged portions in the aforesaid channels and moving said second plate upward, the upper end of the second plate being provided with lateral flanges for engagement with the underneath side of the frame, and means applied to the lower ends of said plates for maintaining them in fixed relation.

17. In a leg construction for articles of furniture of the class described, the combination with frame, of a plate of angular formation embracing the corner of the frame and extending therebelow, the vertical edges of the plate being turned inward beneath the frame and shaped to form channels, and a second angle plate the vertical edges whereof are formed for sliding engagement with the edge portions of the former plate, wherefore the second plate may be connected to the former by inserting its edged portions in the aforesaid channels and moving said second plate upward, the upper end of the second plate being arranged for connection with the underneath side of the frame.

18. In a leg construction for articles of furniture of the class described, the combination with a frame, of an angle plate which embraces the corner of the frame and extends below the same and has its vertical edges bent inward beneath the frame, a second angle plate, the vertical edges of said angle plates being formed so as to slidably engage and interlock when the second plate is moved upward relative to the former plate in proper relation thereto, the lower ends of said plates being provided with inwardly directed flanges, an element bearing upon the upper sides of said flanges a finishing cap applied to the outer sides of said flanges, and means connecting and binding together the finishing cap and said element.

19. In a leg construction for articles of furniture of the class described, the combination with a frame, of an angle plate which embraces the corner of the frame and extends below the same and has its vertical edges bent inward beneath the frame, a second angle plate, the vertical edges of said angle plates being formed so as to slidably engage and interlock when the second plate is moved upward relative to the former plate in proper relation thereto.

20. In a leg construction for articles of furniture of the class described, the combination with an inwardly opening channel frame having vertical slots adjacent to and on each side of its corner, of an angle plate embracing the corner of the frame and extending below the same, the vertical edges of said plate being turned inward through said slots and beneath the frame, and means for retaining said edges against withdrawal from said slots.

21. In combination with a cabinet involving a back, a partition at substantially right angles to the plane of the back and consisting of a plate of U-shape formation in horizontal section, and a member carried by the back of the cabinet for spacing apart and to which are secured the rear vertical edges of the plate.

22. In combination with a cabinet involving a back plate, a partition at substantially right angles to the plane of the back plate and consisting of a plate of U-shape formation in horizontal section having its upper edge attached to the top of the cabinet, and a channel member secured to the back plate and to which the rear vertical edges of the plate are secured.

23. In combination with a cabinet involving a back plate and a member spaced from and located beneath its top, a partition consisting of a plate of U-shape formation in horizontal section having its upper edges secured to the top of the cabinet and its lower edges secured to the aforesaid member, and a member carried by the back plate and to the sides of which the rear edges of the aforesaid plate are connected.

24. In combination with a cabinet of the character described, a partition consisting of a plate having a central portion and side portions at right angles thereto and spaced from and substantially parallel to each other, and a member secured to one wall of the cabinet and to the sides of which the ends of the aforesaid plate are connected, the opposed side edges of the plate being arranged for connection with adjoining parts of the cabinet.

25. In combination with a cabinet involving opposed frame members, a back plate depending from one, and a throat piece spaced below the other; partitions supporting members supported in parallel relation to each other by and between the opposed frame members, an element carried by the back plate, and a partition consisting of a plate having a central portion and side portions spaced from and in substantially parallel relation to each other, the upper edges of the side portions being connected to the partition supporting members while the lower edges are connected to the throat piece, the vertical edges of the plate having connection with the sides of the aforesaid element.

26. In combination with a cabinet involving opposed channel members which open toward each other, a back plate depending from one, and a throat piece spaced below the other, the throat piece being provided with an upwardly extending rib and the channel member being provided with a depending drawer jamb in the plane of said rib; partition supporting members supported in parallel relation to each other with their ends within the opposed channel members, a partition consisting of a plate of U-shape formation in horizontal section having the upper edges of its side portions flanged for connection with the aforesaid partition supporting members and the lower edges of said portions flanged for connection with the throat piece, said edges being notched at their forward ends to escape, respectively, the drawer jamb of the channel member and the rib of the throat piece, the upper and lower edges of the central portion of said plate overlying the drawer jamb and rib, respectively, and a member carried by the back plate to the sides of which the rear edges of the plate are connected.

27. In combination with a cabinet of the character described and involving opposed channel members which open toward each other, a back plate depending from one, and a throat piece spaced below the other, said throat piece being formed of sheet metal and having a rib along its upper side, a drawer jamb depending from said other channel member, said jamb and rib being in substantially the same plane and inset from the front surfaces of the throat piece and channel member, partition supporting members supported in parallel relation to each other with their ends within the opposed channel members; a partition consisting of a plate of substantially U-shape formation in horizontal section the side portions whereof are flanged at their upper ends for connection with the partition supporting members and at their lower edges for connection with the throat piece, said edges being notched at their forward ends for the accommodation, respectively, of the drawer jamb and rib, the front surfaces of the jamb and rib being formed to receive the respective upper and lower ends of the central portion of the partition so that the surfaces of said central portion, jamb and rib are substantially flush, a bar extending longitudinally of said central portion between the throat piece and the channel member, the front surface of which bar is in substantially the plane of the front surfaces of said channel member and throat piece, and a member secured to the back plate of the cabinet and to the sides of which the rear edges of the partition plate are secured.

28. In combination with a cabinet of the character described and involving opposed channel members which open toward each other, a back plate depending from one, and a throat piece spaced below the other, said throat piece being formed of metal, a portion whereof is buckled upward to form a rib spaced inward from the front of the throat piece, a drawer jamb depending from the channel member above, the front surfaces of the channel member and the throat piece being in substantially the same plane and the jamb and rib inset a like distance from said plane, and a pair of partition supporting members supported in parallel relation to each other with their ends within the opposed channel members; a partition consisting of a plate of substantially U-shape formation in horizontal section having the upper edges of its side portions flanged for connection with the partition supporting members and the lower edges flanged for connection with the throat piece, said upper and lower edges being notched at their forward ends for the accommodation, respectively, of the jamb and rib, the jamb having a portion depressed rearwardly substantially the thickness of the metal whereof the partition is made for the reception of the adjacent end of the central portion of the partition, the lower end of said central portion being notched at its middle, upward from its lower edge a distance substantially equal to the height of the aforesaid rib thereby to produce spaced tongues, the front of the rib being cut away to receive said tongues, a bar extending longitudinally of the central portion of the partition and between the throat piece and channel member thereabove, the front surface of said bar being in substantially the plane of the corresponding surfaces of said channel member and throat piece, and a member carried by the back plate and to the sides whereof the rear edges of the partition plate are secured.

29. A bracket for use within the angle between members of a sheet metal structure, said bracket being formed of side members that are connected by a central member, the side members having edges which bear the same angular relation to each other as the aforesaid members of the structure, adjacent edges of the bracket being turned inward toward each other and then outward and away from each other to form outwardly opening channels, and one of the members of the structure having a slot the opposed edges whereof are embraced by the channels of the bracket.

30. In a construction of the character set forth, the combination of a channel member having its web provided with transverse slots, a plate having its side flat against the web of the channel member and its opposed edges turned laterally through the slots thereof, and means for holding said edges against withdrawal from the slot.

31. In a construction of the character set forth, the combination of a sheet metal member having a rib of double thickness of metal, one side of the rib being cut away from the crest to the base of the rib thereby to produce a notch, and a second sheet metal member for coöperation with the first, the same having a tongue that is adapted to occupy said notch and an edge portion for engagement with the first member on the side of the rib remote from the notch, the second member being cut away to accommodate the rib.

32. In a construction of the character set forth, the combination of a sheet metal member having a rib of double thickness of metal, one side of the rib being cut away from the crest to the base of the rib thereby to produce a notch and an opening through said member at the base of the rib, and a second sheet metal member for coöperation with the first, the same having a tongue that is adapted to occupy said notch and pass through the opening and an edge portion for engagement with the first member on the side of the rib remote from the notch, the second member being cut away to accommodate the rib.

33. In a construction of the character set forth, the combination of a sheet metal member having a rib of double thickness of metal, one side whereof is cut away from crest to base thereby to provide a notch and an opening through the member, and a second member having portions which are angularly disposed to each other, one of said portions having an extension arranged to occupy the notch and project through said opening and the other having an edge portion flanged for connection with the first member on the side of the rib remote from the notch, the second member being cut away to accommodate the rib.

34. In an article of furniture, the combination of an upper and a lower channel frame, and members having upper and lower portions extending across the webs of the respective channel frames, the webs of the channel frames being slotted to receive the edges of the aforesaid portions thereby to hold the frames against separation, the members also having abutments engaged by the frames and serving to space the frames apart.

35. In an article of furniture, the combination of an upper and a lower frame, opposed end members spacing apart and connecting the frames, the front and rear edge portions of the end members being turned inward, liners spaced inward from the end members and connecting their front and rear edge portions, and a bottom plate supported upon the lower frame within the confines of the end members and arranged in supporting relation to the liners.

36. In an article of furniture of the character set forth, the combination of a frame of inwardly opening channel members constituting the upper end of the body portion of the article, and a sheet metal top having a peripheral depending flange and an inwardly directed portion therebeyond arranged to rest upon the frame, the inner edge whereof is turned downward to engage the inner edge of the frame thereby to properly position the top with respect to the frame.

37. A mirror support for articles of furniture of the character set forth comprising front and side walls formed of an integral sheet, a rear wall having its side edges interlocked with the rear edges of the side walls, one of the walls having its upper end turned over to constitute a top for the support, and a connecting device situated at the lower end of the support.

38. A mirror support for articles of furniture of the character set forth comprising front and side walls formed of an integral sheet, a rear wall, the side walls having their rear edges turned inward and interlocked with the side edges of the rear wall wherefore the joints between the side and rear walls are concealed from the front of the support, and a connecting device situated at the lower end of the support.

39. In an article of furniture of the character set forth, the combination of a frame constituting the upper end of the body portion of the article, and a sheet metal top having a peripheral depending flange and an inwardly directed portion therebeyond arranged to rest upon the frame, a part of the inwardly directed portion being turned downward to engage the inner edge of the frame thereby to properly position the top with respect to the frame.

In testimony whereof I hereunto affix my signature in the presence of two witnesses.

ADOLF B. JIPPSON.

Witnesses:
Hugh B. McGill,
K. N. Sommers.